(12) United States Patent
Kashihara

(10) Patent No.: US 7,746,499 B2
(45) Date of Patent: Jun. 29, 2010

(54) COLOR IMAGE PROCESSING APPARATUS AND METHOD

(75) Inventor: Atsushi Kashihara, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1749 days.

(21) Appl. No.: 10/891,976

(22) Filed: Jul. 14, 2004

(65) Prior Publication Data
US 2005/0024655 A1 Feb. 3, 2005

(30) Foreign Application Priority Data
Jul. 31, 2003 (JP) .............................. 2003-204810

(51) Int. Cl.
*G06F 15/00* (2006.01)
*G06K 9/34* (2006.01)

(52) U.S. Cl. ........................ 358/1.9; 382/164

(58) Field of Classification Search .................. 358/1.9, 358/1.1, 1.15, 2.1, 523, 504, 1.13, 520, 525, 358/448, 1.8, 540; 382/164, 252, 167, 237, 382/239, 244, 135, 100; 101/484, 211, 365; 347/100, 15, 43, 137, 231; 348/222.1, 395.1, 348/207.1, 361, 607
See application file for complete search history.

(56) References Cited

U.S. PATENT DOCUMENTS 6,222,635 B1 * 4/2001 Gotoh ........................ 358/1.15
6,257,693 B1 * 7/2001 Miller et al. ................... 347/19
2004/0001228 A1 * 1/2004 Goto et al. .................... 358/2.1

FOREIGN PATENT DOCUMENTS

JP 07-195753 8/1995

* cited by examiner

*Primary Examiner*—Saeid Ebrahimi Dehkordy
(74) *Attorney, Agent, or Firm*—Canon USA Inc IP Div

(57) ABSTRACT

A color image processing system outputs data to a color image forming unit for forming a color visible image by overlapping a plurality of color developers. The color image processing system includes a print data receiving unit that receives print data, a bitmap data producing unit that produces bitmap data having colors that correspond to the plurality of color developers from the print data, a data size determining unit that determines a data size of the bitmap data, and a degrading unit. When the data size determined by the data size determining unit is greater than a predetermined size, the degrading unit produces bitmap data having fewer colors, wherein a predetermined color is removed from the colors corresponding to the plurality of color developers.

12 Claims, 5 Drawing Sheets

COLOR IMAGE PROCESSING APPARATUS AND METHOD

This application claims priority from Japanese Patent Application No. 2003-204810 filed Jul. 31, 2003, which is hereby incorporated by reference.

BACKGROUND OF THE INVENTION

1. Field of the Invention

The present invention relates to a color image processing system and method.

2. Description of the Related Art

Generally, page printers such as laser beam printers start printing after storing all print data for one page in a memory. If the memory does not have a sufficient capacity to store all print data for one page, such printers cannot start printing.

In another printing technique, bitmap image data is generated from print data, not in units of pages but in units of predetermined regions (bands) in order to reduce the memory capacity required. This technique is known as "banding" and is well known in the art.

In page printers of the related art, the duration from print start to print end is defined by a printer engine characteristic and once started, printing cannot be stopped until all pages are finished. Thus, if all image data for one page is not loaded at the end of printing (e.g., due to small memory size of work area, low transfer rate of generated image data, etc.), a print error occurs.

In order to overcome this problem, in the related art, the data size is detected in advance and, if the detected size is greater than a predetermined value, the image quality is lowered to reduce the data size, i.e., the so-called degrading operation is performed, thus allowing continuous printing to occur. Such a degrading operation is disclosed in Japanese laid-open patent H07-195753.

However, the degrading operation reduces the number of bits and the resolution of the image data, e.g., reducing the resolution from 600 dpi to 300 dpi. In such a case, unsatisfactory results are produced since the final image quality is degraded. The degrading operation in the Japanese laid-open patent H07-195753 mainly focuses on continuous printing, and there is no description of minimizing the lowering of image quality in that patent.

SUMMARY OF THE INVENTION

In view of the foregoing problems of the related art, one feature of the present invention is that it provides a color image processing system and method in which the amount of print data is reduced without significant reduction in the image quality, whereby the color image processing system and method are achievable with a low-cost memory configuration.

In one aspect, the present invention provides a color image processing system that overlaps colors corresponding to a plurality of color developers onto a sheet of paper based on print data to form a color visible image, including a print data receiving unit that receives print data, a bitmap data producing unit that produces bitmap data having colors that correspond to the plurality of color developers from the print data, a data size determining unit that determines a data size of the bitmap data, and a degrading unit. When the data size of the bitmap data determined by the data size determining unit is greater than a predetermined size, the degrading unit produces bitmap data having fewer colors by removing a predetermined color from the colors corresponding to the plurality of color developers.

The degrading unit may replace bitmap data of the predetermined color to be removed with bitmap data of another color.

The plurality of color developers may include cyan, magenta, yellow, black, light cyan, and light magenta, and the predetermined color to be removed may include light cyan and light magenta.

The degrading unit may perform the processing in units of drawn objects.

In another aspect, the present invention provides a color image processing method for overlapping colors corresponding to a plurality of color developers onto a sheet of paper based on print data to form a color visible image. The color image processing method includes a print data receiving step of receiving print data, a bitmap data producing step of producing bitmap data having colors that correspond to the plurality of color developers from the print data, a data size determining step of determining a data size of the bitmap data, and a degrading step of, when the data size determined in the data size determining step is greater than a predetermined size, producing bitmap data having fewer colors, wherein a predetermined color is removed from the colors corresponding to the plurality of color developers.

In still another aspect, the present invention provides a color image processing system that overlaps colors corresponding to a plurality of color developers onto a sheet of paper based on print data to form a color visible image, including a determining unit that determines a data size of data in at least one of a plurality of unit blocks divided from an object to be processed, and an image processing unit that adaptively changes a combination of the plurality of color developers to be used for the object in accordance with the data size determined by the determining unit to produce image data. The image processing unit may determine a combination of the plurality of color developers to be used for the overall object in accordance with the data size determined by the determining unit. The object to be processed may be an entire page or a drawn object.

In still another aspect, the present invention provides a color image processing system that outputs data to a color image forming unit for forming a color visible image by overlapping colors corresponding to a plurality of color developers. The color image processing system includes a print data receiving unit that receives print data, a bitmap data producing unit that produces bitmap data having colors that correspond to the plurality of color developers from the print data, a data size determining unit that determines a data size of the bitmap data, and a degrading unit. When the data size determined by the data size determining unit is greater than a predetermined size, the degrading unit produces bitmap data having fewer colors, wherein a predetermined color is removed from the colors corresponding to the plurality of color developers.

Further features and advantages of the present invention will become apparent from the following description of the embodiments with reference to the attached drawings.

DETAILED DESCRIPTION OF THE INVENTION

Embodiments of the present invention will now be described in detail with reference to the drawings.

First Embodiment

A color laser beam printer (hereinafter referred to as a "color LBP") according to an embodiment of the present invention will now be described.

Figure 1:
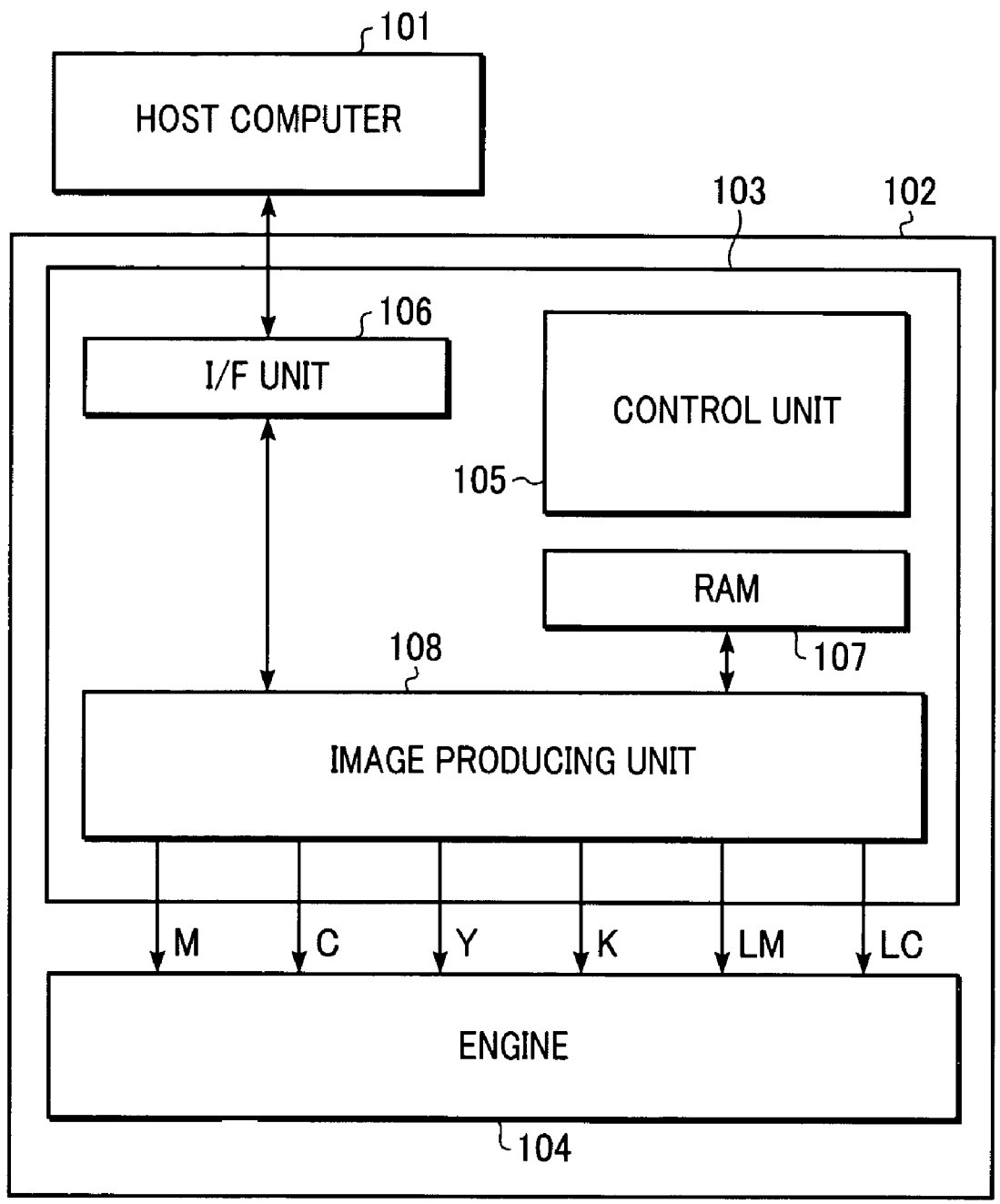
FIG. 1 is a block diagram of a printer system according to an embodiment of the present invention.

FIG. 1 is a block diagram of a printing system including a host computer 101 and a color LBP 102. The host computer 101 and the color LBP 102 are connected with each other via an interface. In FIG. 1, the host computer 101 and the color LBP 102 are directly connected with each other; however, the present invention is not limited to this form. The host computer 101 and the color LBP 102 may be connected via a network (not shown).

The color LBP 102 includes a controller 103 and a printer engine 104. The controller 103 includes a control unit 105, an interface unit 106, a random access memory (RAM) 107, and an image producing unit 108. The controller 103 receives print data from the host computer 101, and transfers the received data to the printer engine 104 at a given timing. The controller 103 further generates necessary signals to perform desirable printing operations.

The blocks will be described in detail with reference to FIG. 1. The blocks, each being formed of an integrated circuit (IC) or the like that supports a digital signal, are connected with one another using a printed board. Each block is not necessarily formed of a single IC, and may be formed of a plurality of ICs. Alternatively, a plurality of blocks may be formed of a single IC. The control unit 105 generates a control signal for causing each block to perform a predetermined operation at an appropriate timing. The interface unit 106 converts the data sent from the host computer 101 (or via a network) into a signal or form that can be processed by controller 103, which is then transferred to the internal components of the controller 103. The image producing unit 108 performs various types of image processing based on the data sent from the host computer 101 to generate image signals directly acceptable to the printer engine 104. In this embodiment, the image producing unit 108 generates 4-bit image signals for six toner colors supported by the printer engine 104, that is, magenta (M), cyan (C), yellow (Y), black (K), light magenta (LM), and light cyan (LC), with 600 dpi (dots per inch) each. As described below, the printer engine 104 controls the output grayscale of these colors or superimposes the colors for printing, thus allowing for multiple color representations. The RAM 107 serves as a work area for producing an image.

Figure 2:
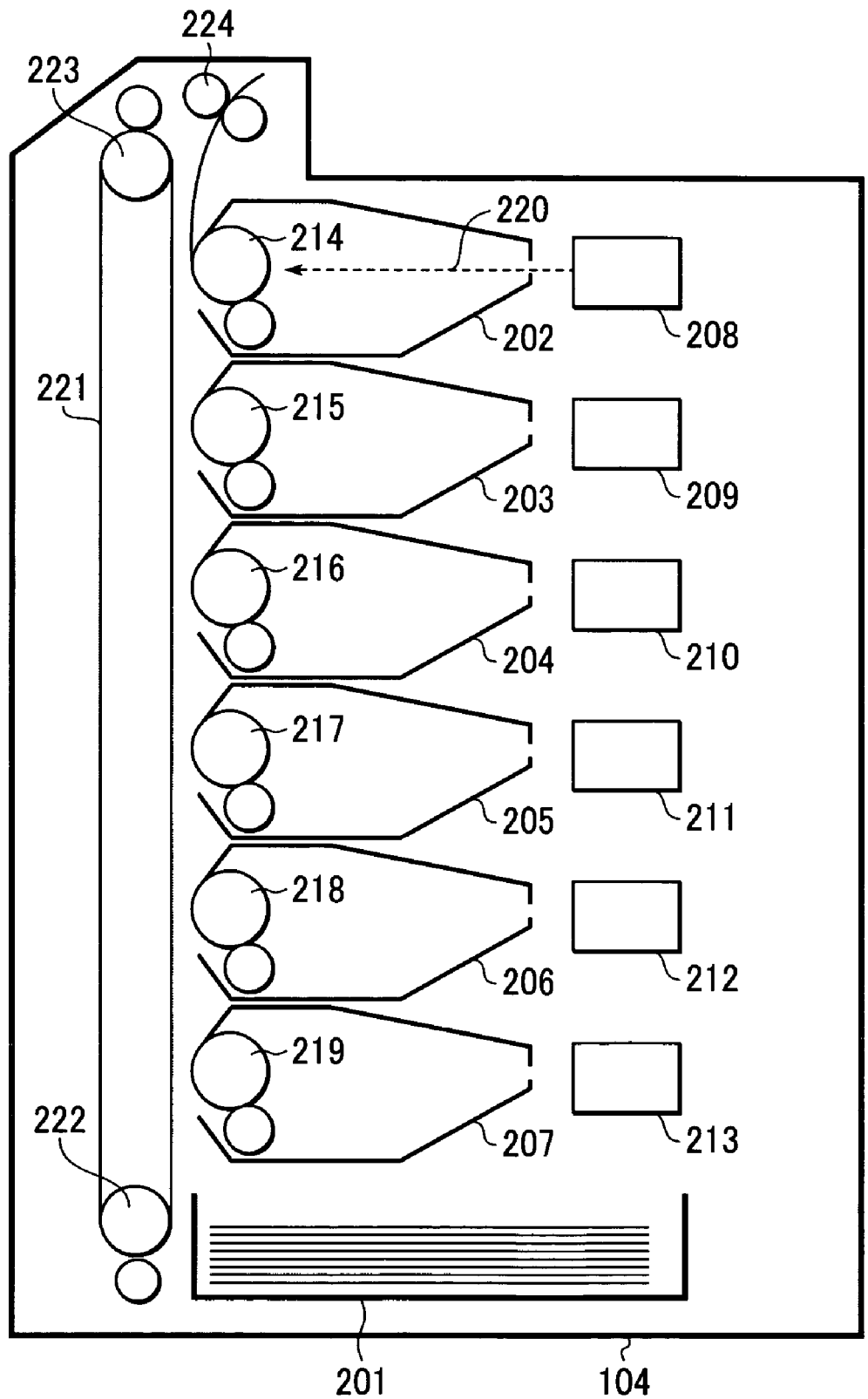
FIG. 2 is a schematic cross-sectional view of a printer engine of the printer system according to the embodiment of the present invention.

FIG. 2 is a schematic cross-sectional view of the printer engine 104. As described above, the printer according to the first embodiment is an electrophotographic color LBP having a print resolution of 600 dpi. The printer engine 104 is a six-drum tandem engine having photoconductor drums for the respective colors, thus allowing for multiple color printing of key colors, i.e., M, C, Y, K, LM, and LC, and a combination thereof. Dark-color and light-color developers are produced by changing the amount of pigment having the same spectral characteristic. Light magenta toner contains a smaller amount of pigment than the magenta toner although the pigment has the same spectral characteristic. Light cyan toner contains a smaller amount of pigment than the cyan toner although the pigment has the same spectral characteristic. The use of dark and light magenta and cyan reduces the graininess in a light image, such as a human skin image, and improves the reproducibility.

In FIG. 2, a paper cassette 201 receives a stack of paper sheets for printing. The sheets of paper are fed one-by-one from the paper cassette 201 by a feeding mechanism (not shown) to a paper conveying belt 221. Toner cartridges 202 to 207 are integrally formed of photoconductor drums 214 to 219, toner receivers (not shown), and waste toner receivers (not shown), are detachable from the body. Image signals for the respective toner colors from the controller 103 are input to scanner units 208 to 213 according to synchronous signals from the scanner units 208 to 213, and the output intensity of internal laser diodes (not shown) of the scanner units 208 to 213 is modulated. Thus, the laser diodes emit strong or weak laser light. The laser light emitted from the laser diodes is directed by an optical system including a scanning mirror and an f-θ lens (not shown) along a locus 220 towards the photoconductor drums 214 to 219 so as to be scanned on the surfaces of the photoconductor drums 214 to 219 from one end to the other. The photoconductor drums 214 to 219 are rotated by a rotating mechanism (not shown), and the scanned laser light forms latent image on the photoconductor drums 214 to 219 in turn. The latent image is formed by pulse width modulation in which the illumination time of laser pulses is modulated depending upon the value of 4-bit multi-level image data having 600-dpi resolution. Thus, the latent image is formed based on the value of the multi-level image data. A known electrophotographic process causes the toner to be attracted to the latent image, thereby developing the image to form the corresponding color images.

The paper conveying belt 221 is driven by rollers 222 and 223. When a sheet of paper is supplied onto the conveying belt 221 from the paper cassette 201, in association with driving of the conveying belt 221, the sheet carried on the conveying belt 221 is conveyed to the photoconductor drums 214 to 219 for the respective colors. When the sheet reaches each photoconductor drum, the toner attached to the photoconductor drum is transferred onto the sheet to form a toner image on the sheet. When the sheet reaches the top, the toner is fused to the sheet by a fusing unit (not shown). The printed sheet reaching the top end is discharged to the outside by rotating a discharge roller 224.

Figure 3:
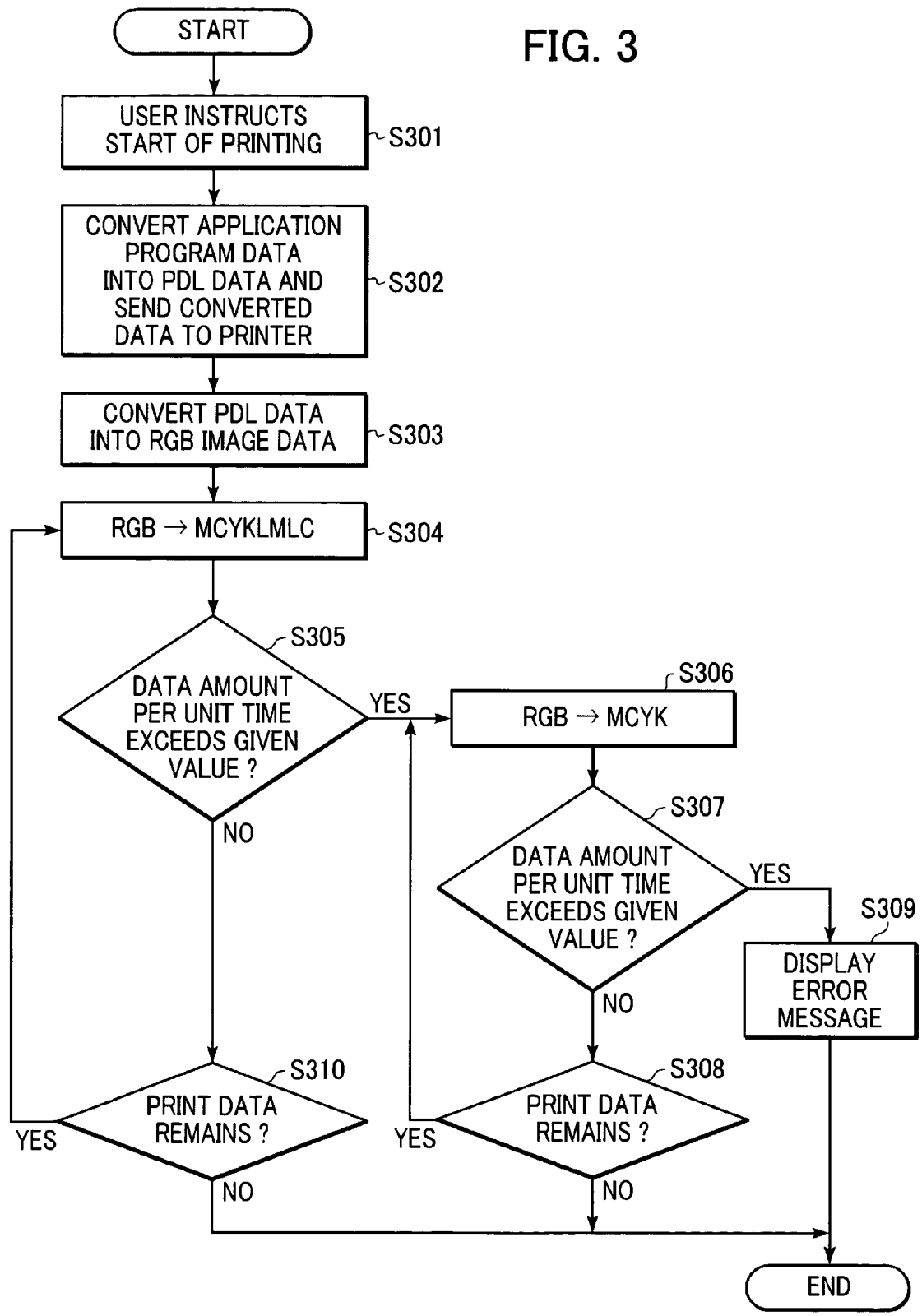
FIG. 3 is a flowchart showing a printing operation according to first embodiment of the present invention.

FIG. 3 is a flowchart showing an operation for outputting data created on the host computer 101 to a printer.

In step S301, the user selects options necessary for printing the created data or specifies a page to be printed, and after the user selection the printing is started. The printing occurs in accordance with a printing instruction method implemented by the application program.

In step S302, a printer driver is selected and initiated by the application program. The data created by the application program is converted into a data format for interpretation by the printer controller 103. A variety of data formats may be employed including vector data for graphic data that is created by the application program, non-image data for text data, such as code data, image data such as RGB image data and grayscale image data, etc. Data that is a complex combination of the data noted above is also conceivable. Such data is converted by the driver program into page description language (PDL) data interpretable to the printer controller 103, which is then sent to the printer 102.

In step S303, the image producing unit 108 of the printer controller 103 converts the PDL data into 8-bit RGB bitmap image data of 600 dpi each for printing. The converted data is compressed using an encoding technique such as JPEG or PackBits, and is then written to the RAM 107 for temporary storage.

In step S304, the image producing unit 108 further converts the RGB image data into image data represented by six colors, i.e., M, C, Y, K, LM, and LC, suitable for printing. Basically, the image data of M, C, Y, K, LM, and LC is produced as 4-bit/pixel data with 600-dpi resolution each. This conversion is sequentially performed not in units of pages but in units of predetermined rectangular regions (bands) or blocks. Thus, the capacity of the RAM serving as a work area can be reduced.

In step S305, it is determined whether the resulting data exceeds a predetermined transfer capacity per unit time. Since the image data for one page is sent to the printer engine 104 with one-page data loaded into the RAM 107, if a certain amount of the image data is not successfully sent per unit time, a print error occurs. If it is determined in step S305 that the data contained in each block does not exceed the predetermined amount, then in step S310, it is determined whether print data (a block to be processed) still remains in the page to be printed. If print data remains, the process returns to step S304 to repeat the processing described above to continue printing. If it is determined in step S310 that no print data remains, the printing operation ends.

If data in the block to be processed exceeds the predetermined amount in step S305, the processing of steps S306 to S309 is performed for data conversion (degrading) in order to reduce the amount of data. An advantage of the present invention is that unlike the degrading process of the related art in which the number of bits or resolution is reduced, in the degrading process of the present embodiment as further described below, bitmap data for colors corresponding to the number of developers is changed.

In step S306, the image producing unit 108 re-converts the RGB data into image data to be output from the printer engine 104. In this example, the RGB data is re-converted into four-color data for M, C, Y, and K, wherein light magenta LM and light cyan LC are removed from the six colors described above. Thus, the capacity of the re-converted image data is reduced to 4/6, and the four-color image data is sent to the printer engine 104. Generally, the print quality of the image data subjected to the degrading process is lower than that of six-color image data; however, even with degrading, the first embodiment allows for an image having an equivalent quality to that of a traditional four-color printer. Therefore, the print quality of the first embodiment is acceptable. Further, note that because specific colors can be selected for degradation, overall image quality remains high since colors less likely to result in significant degradation can be selected unlike in the related art in which degrading operations occur regardless of color.

In step S307, it is determined whether the amount of data per unit time exceeds the predetermined amount in order to check the effect of data conversion performed in step S306. If the amount of data does not exceed the predetermined amount, then in step S308, it is determined whether print data to be processed still remains in the page to be printed. If print data still remains, the process returns to step S306 to repeat the processing described above to continue printing. When no print data remains, the printing operation ends.

If it is determined in step S307 that the amount of data exceeds the predetermined amount after the degrading process, then in step S309, an error message is displayed on a display panel of the printer 102. Then, the printing operation ends.

The printer engine 104 prints the resulting image data in the manner described above.

While a six-drum tandem-type color laser beam printer is employed in the first embodiment, the present invention is not limited to this form. Other forms may be utilized. For example, a two-drum color laser beam printer supporting five colors may be employed. As another example, a single-drum color laser beam printer supporting five colors may be employed.

While the degrading process of the first embodiment has been described in the context of a PDL printer that produces print data in the controller 103, the present invention is not limited to this form. Print data may be produced by a printer driver of the host computer 101, which is then sent to a printer, that is, a so-called host-based printer may also be used.

While a printer that prints data sent from the host computer 101 has been described in the first embodiment, the present invention is not limited to this form. A multi-function printer including a scanner, which is also usable as a color copier or a facsimile machine, may be used.

In the first embodiment, if the amount of MCYK data into which RGB data is re-converted exceeds a predetermined amount per unit time again, the printing operation ends due to the occurrence of errors. A further degrading process, for example, reducing the number of bits from 4 to 2, reducing the resolution, and so forth, would ensure more satisfactory printout although the image quality is lowered.

Second Embodiment

In the first embodiment, if the amount of image data of six colors, i.e., M, C, Y, K, LM, and LC, into which the RGB image data is converted by the image producing unit 108 exceeds a predetermined transfer capacity, the RGB data is re-converted into image data of four colors, i.e., M, C, Y, and K.

In a second embodiment of the present invention, if the six-color image data exceeds a predetermined transfer capacity per unit time, the RGB data is not re-converted but only the converted LM and LC data is re-converted into M and C data.

Figure 4:
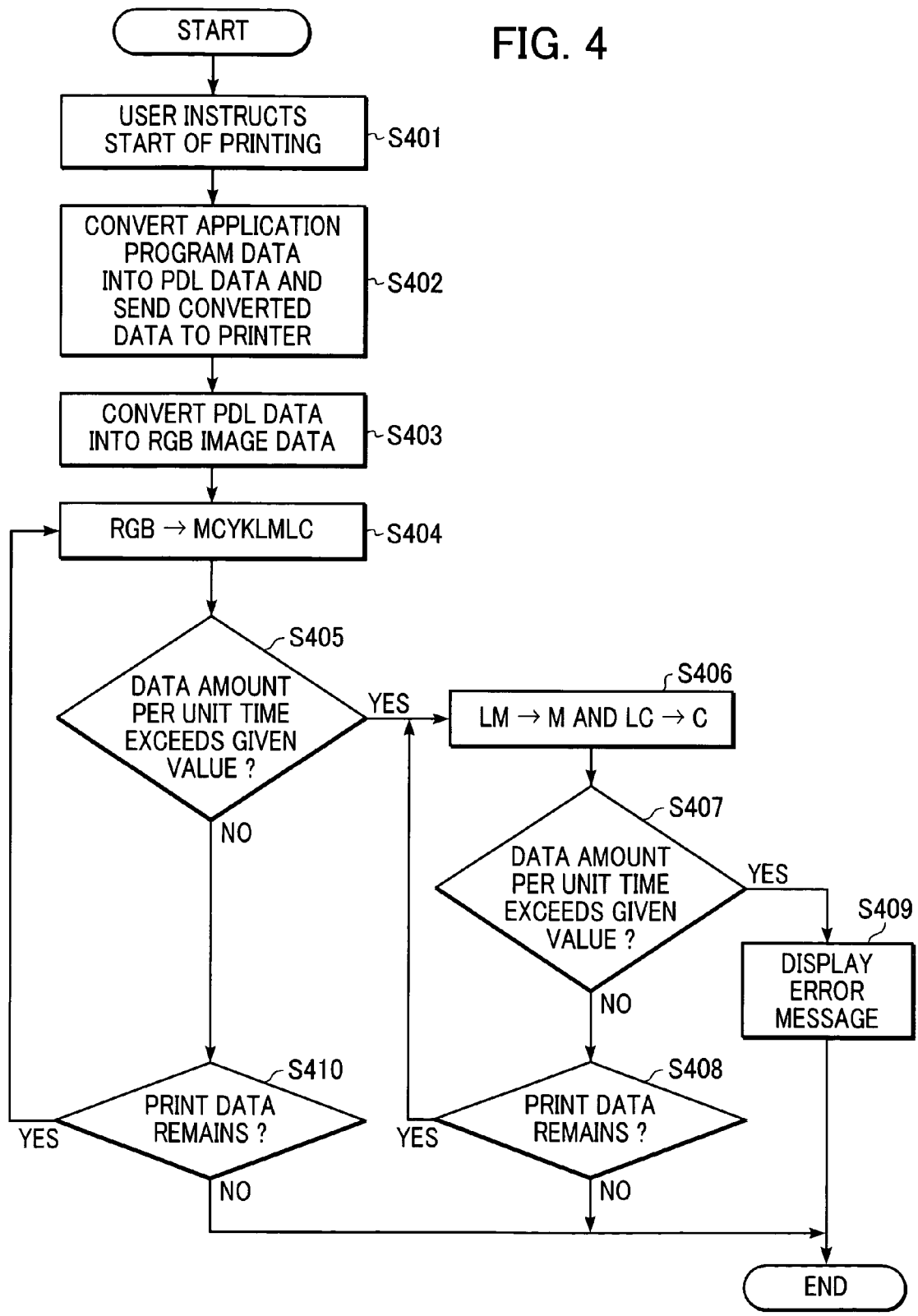
FIG. 4 is a flowchart showing a printing operation according to a second embodiment of the present invention.

FIG. 4 is a flowchart showing the operation according to the second embodiment. The operation of FIG. 4 and FIG. 3 are similar except that in FIG. 4, the converted LM and LC data is re-converted into M and C data. The M and C image data re-converted from the LM and LC data is ORed with the M and C image data converted from the RGB data to produce image data of M and C. Other operations are similar to those of the first embodiment, and a description thereof is thus omitted.

In the second embodiment, it is not necessary to re-convert all RGB image data, thus moderating the reduction in performance caused by degrading.

Third Embodiment

In the first and second embodiments, data of a given page is converted into data four color data, i.e., M, C, Y, and K, for a degrading process. In a third embodiment of the present invention, the degrading process is controlled in units of drawn objects rather than pages.

Print data for one page includes various drawn objects including text, graphics, images, and so on. The image producing unit 108 of the printer controller 103 optimally converts each drawn object to produce final image data to be printed. The printer controller 103 has information about the object that is currently loaded. In the third embodiment, this object information is used to perform a degrading process.

Figure 5:
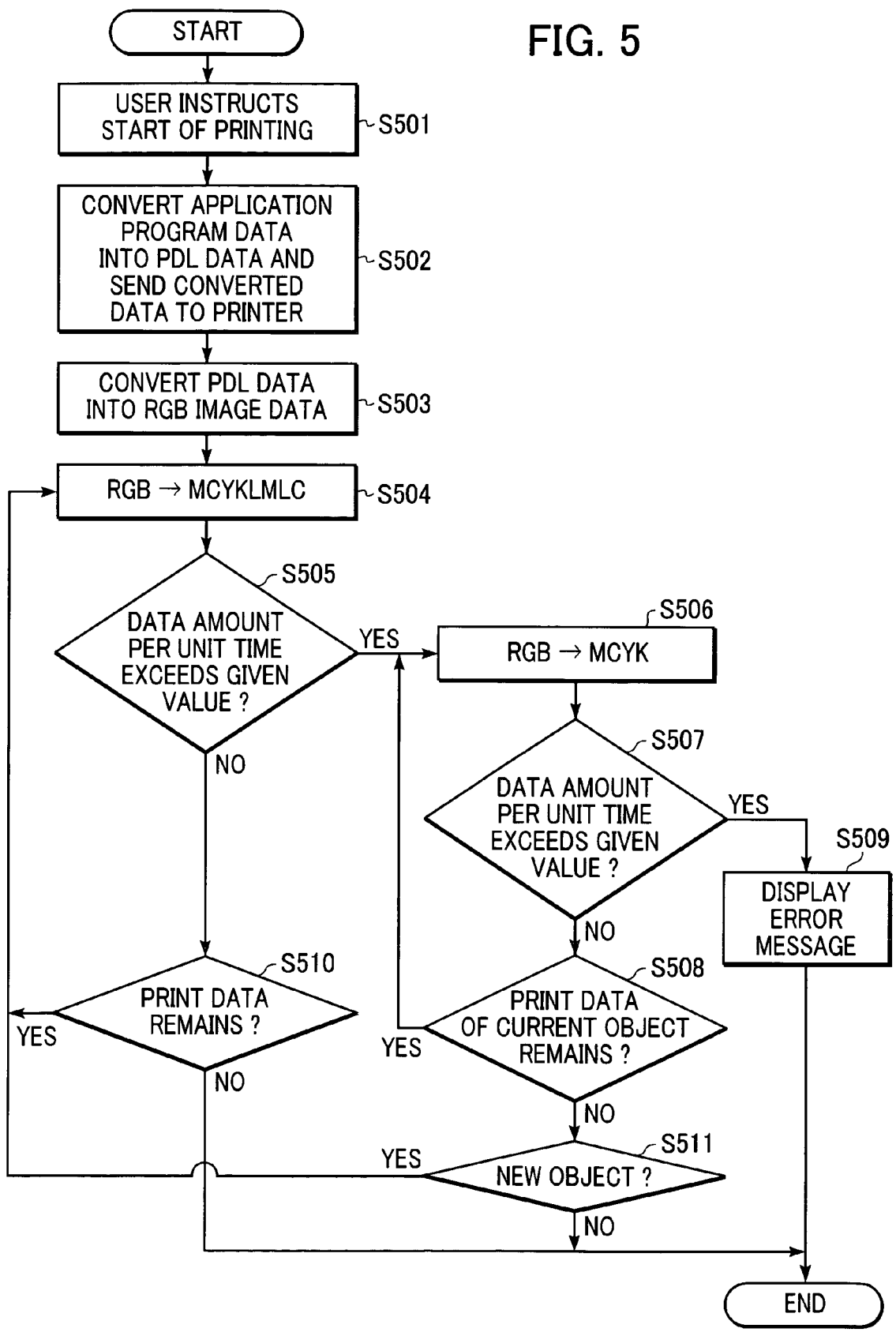
FIG. 5 is a flowchart showing a printing operation according to a third embodiment of the present invention.

FIG. 5 is a flowchart showing an object-based degrading process according to the third embodiment. In FIG. 5, the processing of steps S501 to S507 is similar to the processing of S301 to S307 shown in FIG. 3 described above in the first embodiment, and a description thereof is thus omitted.

In step S508, it is determined whether print data for the current object is present. If print data remains, the process returns to step S506 to perform RGB-to-MCYK conversion; otherwise, the process proceeds to step S511.

In step S511, it is determined whether new object data is present. If it is determined that a new object is present, the process returns to step S504, and this object is first subjected to RGB-to-MCYKLMLC conversion. The subsequent processing is similar to that of the first embodiment. If it is determined in step S511 that no more object data exists, the printing operation ends.

In the third embodiment, a degrading process is performed on an object having complex data while other sections are printed in six colors. Thus, the reduction in image quality caused by degrading can be minimized.

The foregoing embodiments are also achieved by providing a storage medium in which program code for implementing the features of the embodiments described above is recorded for a system or a device and reading and executing the program code from the storage medium by a computer (or a CPU or an MPU) of the system or device. In this case, the program code read from the storage medium realizes the features of the foregoing embodiments. The storage medium that stores this program code constitutes the present invention. Storage media for providing such program code include, but are not limited to, a floppy disk, a hard disk, an optical disk, a magneto-optical disk, a CD-ROM, a CD-R, a magnetic tape, a non-volatile memory card, and a ROM.

The read program code is executed by a computer to realize the features of the embodiments described above. In addition, an operating system (OS) or the like running on the computer executes a portion of or the entirety of actual processing in accordance with an instruction of the program code to implement the features of the embodiments described above.

The present invention also encompasses a case where the program code read from the storage medium is written to a memory of a function extension board inserted into the computer or a function extension unit connected to the computer, after which a CPU or the like of the function extension board or function extension unit executes a portion of or the entirety of actual processing in accordance with an instruction of the program code, to thereby realize the functions of the embodiments described above.

According to the present invention, therefore, even if an error occurs when an image for six-color toner is loaded, image data of fewer colors, e.g., four colors, is re-loaded. Thus, a printout with an equivalent image quality to that of a traditional full-color printout is achievable using a low-cost configuration having no full page memory.

While the present invention has been described with reference to what are presently considered to be embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A color image processing system that overlaps colors corresponding to a plurality of color developers onto a sheet of paper based on print data to form a color visible image, said color image processing system comprising:
   print data receiving means for receiving print data;
   bitmap data producing means for producing bitmap data from the print data, the bitmap data having the colors corresponding to the plurality of color developers;
   data size determining means for determining a data size in units of bit of the bitmap data; and
   degrading means for, when the data size determined by the data size determining means is greater than a predetermined size, producing bitmap data having fewer colors, wherein bitmap data for a predetermined color is removed from the colors corresponding to the plurality of color developers.

2. A color image processing system according to claim 1, wherein the degrading means replaces bitmap data of the predetermined color to be removed with bitmap data of another color.

3. A color image processing system according to claim 1, wherein the plurality of color developers include at least cyan, magenta, yellow, black, light cyan, and light magenta, and the predetermined color to be removed comprises light cyan and light magenta.

4. A color image processing system according to claim 1, wherein the degrading means performs the processing in units of drawn objects.

5. A color image processing system according to claim 1, wherein the degrading means further reduces the number of bits or resolution of the bitmap data.

6. A color image processing method for use in a color image processing apparatus and for overlapping colors corresponding to a plurality of color developers onto a sheet of paper based on print data to form a color visible image, said color image processing method comprising:
   a print data receiving step of receiving print data;
   a bitmap data producing step of producing bitmap data from the print data, the bitmap data having colors that correspond to the plurality of color developers;
   a data size determining step of determining a data size in units of bit of the bitmap data; and
   a degrading step of, when the data size determined in the data size determining step is greater than a predetermined size, producing bitmap data having fewer colors by removing a predetermined color from the colors corresponding to the plurality of color developers.

7. A color image processing method according to claim 6, wherein, in the degrading step, bitmap data of the predetermined color to be removed is replaced with bitmap data of another color.

8. A color image processing method according to claim 6, wherein the plurality of color developers include at least cyan, magenta, yellow, black, light cyan, and light magenta, and the predetermined color to be removed comprises light cyan and light magenta.

9. A color image processing method according to claim 6, wherein the degrading step is performed in units of drawn objects.

10. A color image processing method according to claim 6, wherein the degrading step further includes reducing the number of bits or resolution of the bitmap data.

11. A color image processing system that outputs data to a color image forming unit for forming a color visible image by overlapping colors relating to a plurality of color developers, said color image processing system comprising:

print data receiving means for receiving print data;

bitmap data producing means for producing bitmap data from the print data, the bitmap data having colors that correspond to the plurality of color developers;

data size determining means for determining a data size in units of bit of the bitmap data; and degrading means for, when the data size determined by the data size determining means is greater than a predetermined size, producing bitmap data having fewer colors, wherein a predetermined color is removed from the colors corresponding to the plurality of color developers.

12. A color image processing method for use in a color image processing apparatus and for outputting data to a color image forming unit that forms a color visible image by overlapping colors corresponding to a plurality of color developers, said color image processing method comprising:

a print data receiving step of receiving print data;

bitmap data producing step of producing bitmap data from the print data, the bitmap data having the colors that correspond to the plurality of color developers;

a data size determining step of determining a data size in units of bit of the bitmap data; and a degrading step of, when the data size determined in the data size determining step is greater than a predetermined size, producing bitmap data having fewer colors, wherein a predetermined color is removed from the colors corresponding to the plurality of color developers.

* * * * *